US008802601B2

(12) United States Patent  (10) Patent No.: US 8,802,601 B2
Fuller et al.  (45) Date of Patent: Aug. 12, 2014

(54) METHOD OF TREATING SANDSTONE FORMATIONS WITH REDUCED PRECIPITATION OF SILICA

(75) Inventors: Michael J. Fuller, Houston, TX (US); Isabelle Couillet, Houston, TX (US); Ryan Hartman, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1043 days.

(21) Appl. No.: 12/046,221

(22) Filed: Mar. 11, 2008

(65) Prior Publication Data

US 2009/0233819 A1   Sep. 17, 2009

(51) Int. Cl.
*C09K 8/86*   (2006.01)
(52) U.S. Cl.
USPC ................................. 507/224; 507/237
(58) Field of Classification Search
USPC ........................... 507/203, 24, 269
See application file for complete search history.

(56) References Cited

U.S. PATENT DOCUMENTS

| | | | |
|---|---|---|---|
| 3,937,283 A | 2/1976 | Blauer et al. | |
| 4,174,753 A * | 11/1979 | Graham | 166/307 |
| 4,479,543 A * | 10/1984 | Kalfayan et al. | 166/300 |
| 4,646,835 A | 3/1987 | Watkins | |
| 5,277,823 A * | 1/1994 | Hann et al. | 210/696 |
| 5,529,125 A * | 6/1996 | Di Lullo Arias et al. | 166/307 |
| 5,658,465 A | 8/1997 | Nicholas | |
| 6,435,277 B1 | 8/2002 | Qu et al. | |
| 6,436,880 B1 | 8/2002 | Frenier | |
| 6,506,711 B1 | 1/2003 | Shuchart | |
| 6,521,028 B1 | 2/2003 | Frenier | |
| 6,531,427 B1 | 3/2003 | Shuchart | |
| 6,632,805 B1 | 10/2003 | Liebeskind | |
| 6,703,352 B2 | 3/2004 | Dahayanake et al. | |
| 6,806,236 B2 | 10/2004 | Frenier | |
| 6,846,452 B2 | 1/2005 | Kmec | |
| 7,192,908 B2 | 3/2007 | Frenier | |
| 7,299,870 B2 | 11/2007 | Garcia-Lopez De Victoria | |
| 2004/0254079 A1 * | 12/2004 | Frenier et al. | 507/260 |
| 2005/0137095 A1 | 6/2005 | Cawiezel | |
| 2006/0118302 A1 | 6/2006 | Fuller | |
| 2006/0131022 A1 | 6/2006 | Rae | |

\* cited by examiner

*Primary Examiner* — Susannah Chung
*Assistant Examiner* — Kumar R Bhushan
(74) *Attorney, Agent, or Firm* — Jeremy D. Tillman; Rachel Greene; Tim Curington

(57) ABSTRACT

A method of treating a sandstone-containing formation penetrated by a wellbore is carried out by forming a treatment fluid comprising an aqueous fluid containing a hydrogen fluoride source and an amorphous silica precipitation inhibitor. The treatment fluid is introduced into the formation through the wellbore at a pressure below the fracture pressure of the formation to facilitate dissolution of formation materials, optionally as a single stage. The amorphous silica inhibitor may be a polycarboxylate and/or polycarboxylic acid, an organosilane or a phosphonate compound. The amorphous silica inhibitor may be capable of inhibiting precipitation of amorphous silica so that the treatment fluid contains at least about 500 ppm of silicon after at least about 100 minutes subsequent to the treatment fluid being introduced into the formation.

12 Claims, 4 Drawing Sheets

METHOD OF TREATING SANDSTONE FORMATIONS WITH REDUCED PRECIPITATION OF SILICA

BACKGROUND

The statements in this section merely provide background information related to the present disclosure and may not constitute prior art.

Matrix acidizing of sandstone reservoirs has been carried out for years in order to increase production of oil or gas from hydrocarbon bearing reservoirs or to improve the injectivity of reservoirs undergoing water-injection. The most common main treatment fluids used to dissolve clays and other aluminosilicate minerals are "mud acid" formulations, which are essentially strongly acidic solutions that contain hydrofluoric acid (HF). A key to sandstone matrix stimulation is to maximize the dissolution of damaging aluminosilicate particles (that line and clog the pore space) while minimizing precipitation reactions during the main treatment stage of fluid. Minimizing precipitation limits the potential for damage to the overall formation productivity. This interplay between the favorable dissolution-kinetics and the kinetics of unfavorable secondary precipitation reactions has fueled research meant to gain a better understanding and control of the reaction kinetics of dissolution. In particular, at high temperatures the dissolution reactions in a sandstone matrix are so fast that the resulting precipitation reactions are often uncontrollable.

For many years, organic acids and organic chelating agents have been added to matrix acidizing fluids to minimize precipitation by chelating the metal cations generated in solution. Many of these chelating agents have included such organic acids/chelants as ethylenediaminetertaacetate (EDTA), 2-hydroxyethylethylenediaminetriacetate (HEDTA), nitrilotriacetate (NTA), diethylenetriaminepentaacetate (DTPA), and citric acid, for example. The literature shows that these compound's association constants toward common oilfield metal cations, such as iron, calcium, magnesium, aluminum, and many others, are very strong and minimize the secondary precipitation of their reaction byproducts.

Currently, one of the most dramatic reasons for failure of sandstone matrix acidizing treatments to realize their full stimulation potential is the precipitation of amorphous silica. Unfortunately, the above-mentioned organic chelating agents demonstrate limited ability to either chelate silicon cations/silicate particles or to prevent the precipitation of amorphous silica. Previous attempts at preventing the precipitation of such amorphous silica have shown limited success.

Accordingly, a need exists for new treatment methods and fluids for treating sandstone subterranean formations in oil and gas producer wells and water-injector wells that can minimize the precipitation of amorphous silica during sandstone acidizing treatments toward optimized stimulation of productivity of the formation.

BRIEF DESCRIPTION OF THE DRAWINGS

For a more complete understanding of the present invention, and the advantages thereof, reference is now made to the following descriptions taken in conjunction with the accompanying figures, in which.

SUMMARY

Figure 1:
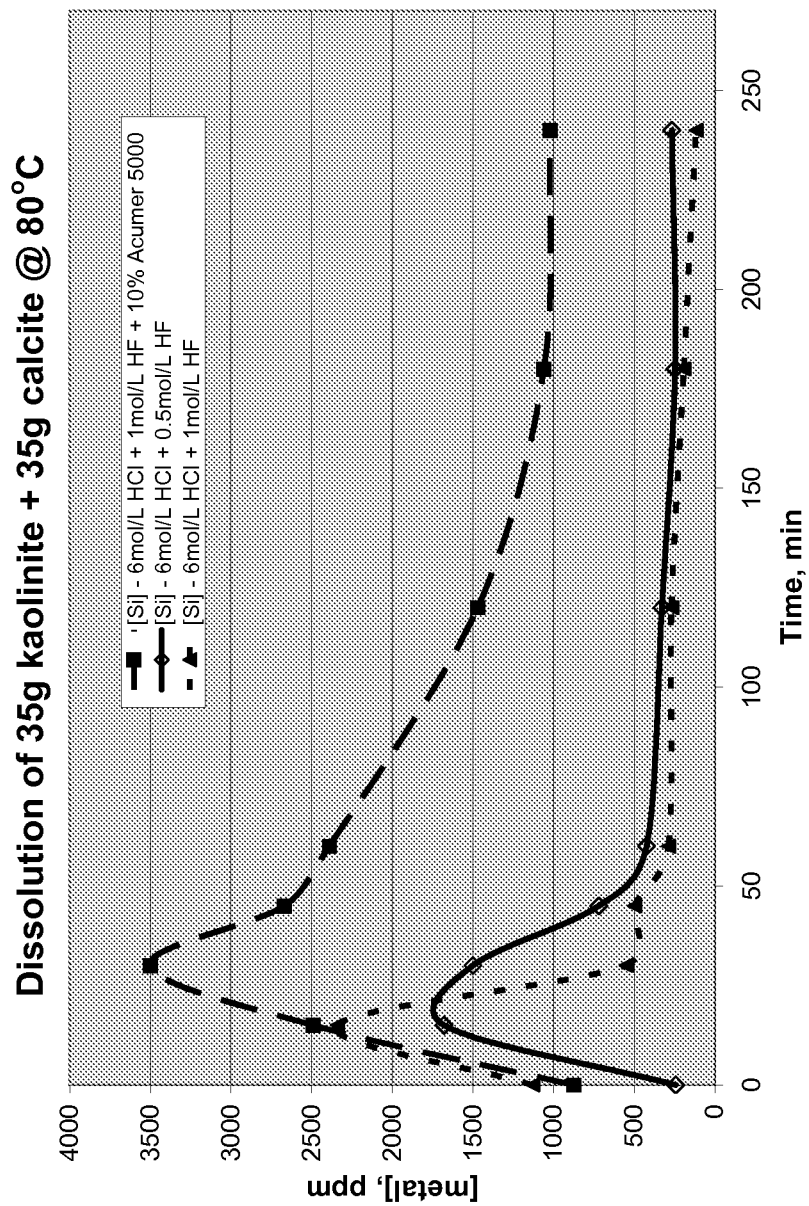
FIG. 1 is a plot of the concentration over time of silicon in acidizing fluids with and without a polycarboxyl silica-precipitation inhibitor used in dissolving kaolinite.

The invention is directed to a method of treating a sandstone-containing formation penetrated by a wellbore to prevent or at least reduce silica precipitation, which may damage the formation. In one embodiment, the method includes forming a treatment fluid comprising an aqueous fluid containing a hydrogen fluoride source and an amorphous silica precipitation inhibitor. The treatment fluid is introduced into the formation through the wellbore at a pressure below the fracture pressure of the formation to facilitate dissolution of formation materials. This may be done optionally as a single stage treatment. The amorphous silica inhibitor is capable of inhibiting precipitation of amorphous silica so that the treatment fluid contains at least about 500 parts-per-million (ppm) of silicon after at least about 100 minutes subsequent to the treatment fluid being introduced into the formation.

In certain embodiments, the amorphous silica precipitation inhibitor is selected from at least one of a polycarboxylate or salt thereof and/or polycarboxylic acid, an organosilane and a phosphonate compound. The amorphous silica precipitation inhibitor may be present in the treatment fluid in an amount of from about 0.1% to about 15% by weight of the treatment fluid.

In one embodiment the amorphous silica precipitation inhibitor may be selected from at least one of copolymers and homopolymers of acrylic acid and/or maleic acid or salts and derivatives thereof. In another embodiment, the amorphous silica precipitation inhibitor may be selected from at least one of an organosilane, an amine of an organosilane and an ester of organosilane.

In a further aspect of the invention, a method of treating a sandstone-containing formation penetrated by a wellbore is carried out by forming a treatment fluid comprising an aqueous fluid containing a hydrogen fluoride source and a polycarboxylate and/or polycarboxylic acid capable of capable of inhibiting precipitation of amorphous silica. The treatment fluid is introduced the treatment fluid into the formation through the wellbore of the formation to facilitate dissolution of formation materials. The treatment fluid may be introduced as a single stage and below the fracture pressure of the formation. The polycarboxylate and/or polycarboxylic acid may be selected from at least one of copolymers and homopolymers of acrylic acid and/or maleic acid or salts and derivatives thereof. In certain embodiments, the polycarboxylate and/or polycarboxylic acid may be selected from a methacrylic acid or maleic acid polymer. The polycarboxylate and/or polycarboxylic acid may be present in the treatment fluid in an amount of from about 1% to about 15% by weight of the treatment fluid.

DETAILED DESCRIPTION

The description and examples are presented herein solely for the purpose of illustrating the various embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Sandstone or siliceous formations are typically comprised of quartz and clay components, which are not readily dissolved by acids commonly used in the acidizing of carbonate formations. The types of aluminosilicate minerals and particles that are damaging to the permeability of sandstone or siliceous formations or materials are primarily susceptible to dissolution in hydrofluoric (HF) acid. The hydrofluoric acids or mud acids that are typically used in dissolving these formations are highly reactive and lead to the rapid dissolution of the aluminosilicate metal oxide framework. This leads to an initially high amount of silicon in solution. This is followed by a sharp decrease in silicon concentrations (<300 ppm) as a result of precipitation of silicon as solid amorphous silica. The higher the concentration of HF in the treatment fluid, the formation of intermediate species that generate silica precipitates through secondary and tertiary reactions occurs.

As used in accordance with the invention: the term "silica" can mean a crystalline compound, $SiO_2$, occurring abundantly as quartz, sand, flint, agate, and many other minerals; the term "silica" can also mean hydrates or any other complexes of $SiO_2$ or $SiO_2$ found in subterranean formations, such as $SiO_2*2H_2O$; further, "silica" can mean any of a large group of minerals, also known as silicates, that consist of $SiO_2$ or $SiO_4$ groupings combined with one or more metals (e.g., aluminum, barium, beryllium, calcium, iron, magnesium, manganese, potassium, sodium, or zirconium, and the like) and sometimes hydrogen, including cases of surface hydration, where a layer of —OH groups coats the surface of certain silicate species. Silicates may also be considered chemically as salts of the various silicic acids. Silicates may be classified as ortho-, meta-, di-, or trisilicates according to the acid from which they are (theoretically) derived, and also classified by an X-ray diffraction method according to their crystalline structure. Silicates are widely distributed in nature, making up most of the earth's outer crust. Most of the common rock-forming minerals (e.g., quartz, feldspar, mica, and pyroxene) are silicates, as are asbestos, beryl, aquamarine, emerald, serpentine, and talc. Clay consists essentially of hydrous aluminum silicates mixed with other substances. Glass is a mixture of silicates, as is water glass.

The present invention makes use of compounds that have been shown to inhibit amorphous silica precipitation when used in combination with aqueous HF treatment fluids. In particular, the compounds are used in combination with a hydrogen fluoride source capable of dissolving the subterranean sandstone or siliceous formations so that the amount of precipitation of amorphous silica is reduced or minimized. These compounds are referred to herein as "amorphous silica precipitation inhibitors." In experiments where aluminosilicate minerals are exposed to an acidizing fluid at temperatures, these inhibitors show the ability to either increase the final concentration of the dissolved silicon in the treatment solution or eliminate or reduce the downward slope of the silicon concentration compared to the same treatment fluid used under the same or similar conditions without the use of such amorphous silica precipitation inhibitors. Different compounds may be used as the amorphous silica precipitation inhibitors. In particular, it has been found that the use of polycarboxylates and/or polycarboxylic acids, organosilanes and phosphonate compounds each may inhibit the precipitation of amorphous silica when used in acidizing fluids containing hydrogen fluoride.

The polycarboxylate and/or polycarboxylic acid amorphous silica precipitation inhibitors, which may be hereinafter referred to as "polycarboxyl silica-precipitation inhibitors," are believed to inhibit the precipitation of amorphous silica through one of two possible mechanisms. The polymer may interact with silicon reaction byproducts in the solution phase, maintaining higher concentrations of dissolved silicon in solution compared to control fluids that lack the inhibitor additive. The other mechanism involves the association of the polycarboxylate with the surface of very small (<200 nm) particles of amorphous silica and poisons the further growth of those particulates. The polycarboxyl-precipitation inhibitors may be based on homopolymers and copolymers of acrylic acid and/or maleic acid and/or other polycarboxylate monomers or the salts and derivatives thereof. As used herein, "copolymers" are meant to encompass polymers formed from two or more different monomers, such as terpolymers, and may include both block or random copolymers or combinations of these. The derivatives may include those having sulfate and phosphonate functionalities, which act to increase the charge density of the polymers and increasing electrostatic interactions between precipitate particles. The acrylic acid or salts and derivatives may include alkylacrylic acids and salts. In particular, the alkylacrylic acid or salt may include methacrylic acid and its salts.

Suitable compounds may be homopolymers or copolymers of polycarboxylic acids containing at least two carboxylic acid groups, as well as salts or partial salts of such acids and derivatives of such acids. Useful compounds may include polymers formed from acids such as formic acid, malic acid, maleic acid, oxalic acid, and the like, as well as acrylic acid, methacrylic acid, 4-vinylbenzoic acid, 4-vinylsalicylic acid, acid-precursors including maleic anhydride and copolymers formed from such acids and acid precursors. Useful salts or partial salts of such acids include most preferably ammonium salts but may also include potassium salts and sodium salts and the like.

The polycarboxyl silica-precipitation inhibitors may have an average molecular weight of from about 1000 to about 25,000 or more, with from about 2000 to about 10,000 being typical. Examples of suitable polycarboxyl silica-precipitation inhibitors may include those described in U.S. Pat. Nos. 5,277,823 and 5,658,465, each of which is herein incorporated by reference in its entirety. An example of a commercially available material that may be used as a polycarboxyl silica-precipitation inhibitor is that available as ACUMER® 5000, available from Rohm and Haas Company, which has an average molecular weight of approximately 5000 and is a terpolymer with three distinct functionalities: carboxylate (weak acid), sulfonate (strong acid) and third functionality to balance hydrophobicity/lipophilicity.

The polycarboxyl-precipitation inhibitors are used in solution and may be used in amounts of from about 1% to about 15% by weight of the treatment fluid, more particularly from about 1% to about 7% by weight of the acidizing treatment fluid.

The amorphous silica precipitation inhibitor may also include organosilane compounds. These may be hydrolyzable organosilicon compounds that hydrolyze in an aqueous environment to form siloxane bonds upon reaction either with each other or with the silanol (Si—OH) groups of silicon-oxide-containing surfaces. Within the current invention, the organosilicon compound is believed to react with the primary insoluble particle of silica formed during the acidizing treatment to form covalent siloxane (Si—O—Si) bonds by condensation/polymerization reactions. The silanol groups thus formed at the silica particle surface prevent further polymerization and so generation of secondary insoluble amorphous silica particles is prevented, as well as maintenance of small insoluble particles with mean diameters<200 nm in solution.

Illustrative examples of suitable hydrolyzable organosilicon materials are described in U.S. Pat. Nos. 4,479,543, 4,646,835 and 6,632,805, each of which is incorporated herein by reference in its entirety.

The hydrolyzable organosilicon compounds may include, but are not limited to, amino silanes, vinyl silanes, esters of organosilanes and combinations of these. These may include dihalosilanes, trihalosilanes and dialkyloxysilanes and trialkyloxysilanes, in which the alkoxy substituents are hydrolysable. Specific examples of suitable organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, etc.

Specific examples of suitable esters of organosilanes include esters of organosilanes include divinyldimethoxysilane, divinyldi-β-methoxyethoxy silane, di(γ-glycidoxypropyl) dimethoxysilane, vinyltriethoxysilane, vinyltris-β-methoxyethoxysilane, γ-glycidoxypropyltrimethoxysilane, γ-methacryloxypropyltrimethoxysilane, β-(3,4-epoxycyclohexyl)ethyltrimethoxysilane, N-β-aminoethyl-γ-propylmethyldimethoxysilane, N-β-aminoethyl-γ-propyltrimethoxysilane, N-β-aminoethyl-γ-aminopropyltrimethoxysilane, γ-aminopropyltriethoxysilane, N-(β-aminoethyl)-γ-aminopropyltrimethoxysilane, etc.

When added to certain low-pH matrix acidizing solutions that contain hydrofluoric acid, the organosilane does not visibly affect the rate of dissolution of the fluid toward aluminosilicate clays. When added to "mud acid" formulations (solutions of hydrochloric and hydrofluoric acid), the rate of dissolution are solely impacted by the concentration of hydrofluoric acid and the temperature and the organosilane will act as a spectator ion, preferentially reacting with and bonding to the growing amorphous silica particles. The dissolution of clays, r, may be considered as first order with respect to the concentration of hydrofluoric acid, [HF]. The rate of dissolution may be expressed as:

$$(-r) = kK_a[HF] \tag{1}$$

However, the dissolution of clays by hydrofluoric acid is dependent on HF acting in its molecular (uncharged form) HF. It is known in the literature that hydrofluoric acid is a weak acid (pKa=3.5) and as such, will deprotonate to yield F⁻ at pH>3.5. Therefore, high concentrations of H+ (achieved at very low pH values) are required to provide a sufficient population of hydrofluoric acid to dissolve clays. Therefore, it is not surprising that the upward slope of dissolved aluminum illustrated in the examples (used to quantify the rate of clay dissolution) is comparable in the absence or presence of the organosilane, considering the comparable HF concentration and low-pH in the test.

Additionally, the amorphous silica precipitation inhibitor may also be a phosphonate compound. These behave similarly to the organosilanols, previously described, in the manner in which they strongly bind to the silanol groups of the amorphous silica particles to thus inhibit further polymerization and growth of secondary insoluble silica particles. The phosphonate materials may be in solid or liquid form. These materials may initially be in the form of solid particles. Such materials may include phosphonic acids and the salts and esters of phosphonic acids. Illustrative examples of suitable phosphonate compounds are described in U.S. Pat. No. 5,529,125, which is herein incorporated by reference in its entirety.

The phosphonate compounds may have a structure represented by the following formula:

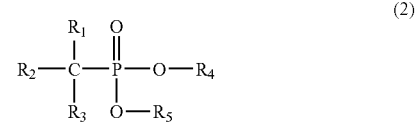

(2)

wherein $R_1$, $R_2$ and $R_3$ is each selected from one of a hydrogen, alkyl, aryl, phosphonate, phosphate, acyl, amine, hydroxyl or carboxyl group, and wherein $R_4$ and $R_5$ is selected from one of hydrogen, sodium, potassium, ammonium or an organic radical. Specific examples of suitable phosphonate compounds may include aminotri (methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt.

The organosilane or phosphonate amorphous silica precipitation inhibitor may be used in a total amount of from about 0.1% to about 10% by weight of the acidizing treatment fluid. More typically, the organosilane or phosphonate amorphous silica precipitation inhibitor is used in a total amount of from about 0.5% to about 5% by weight of the treatment fluid.

In certain embodiments, a combination of the polycarboxyl, organosilane or phosphonate silica precipitation inhibitors may be used in the same solution.

In etching of the sandstone formations in accordance with the invention, a hydrogen fluoride source is used to dissolve or etch the sandstone materials of the formation. The hydrogen fluoride source may be hydrogen fluoride (HF) itself or it may form or release hydrogen fluoride in solution. Typically, a pH of less than 4 is desired to facilitate etching of the siliceous material of the fracture. In acidic aqueous fluids, i.e. pH less than 5, the hydrogen fluoride source material releases hydrogen fluoride and may optionally slowly dissolve, completely or in part. Examples of such solid hydrogen fluoride sources are hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers (e.g. TEFLON®), and combinations of these.

In certain embodiments of the invention, the source of hydrogen fluoride may be ammonium bifluoride, although others sources of hydrogen fluoride may be used, such as ammonium fluoride and hydrofluoric acid. When the hydrogen fluoride source is ammonium bifluoride, it may be present in the final treatment fluid in an amount between about 0.5% and about 50% by weight, more particularly between about 1% and about 3% by weight. When the hydrogen fluoride source is ammonium fluoride, greater amounts may be used. For ammonium fluoride, it may be present in the final slurry in an amount between about 1.5% and about 5% by weight, more particularly between about 2.5% and about 5% by weight.

In most cases, the hydrogen fluoride source is combined with other acids. The acid-based fluid may be an aqueous fluid that is acidized with non-HF acids or non-HF acid precursors. This may include mixtures of different acids. Such mixtures or solutions employing hydrofluoric acid and at least one other acid are commonly referred to as "mud acids" and are well known to those skilled in the art. The non-HF acids used may include, but are not limited to, hydrochloric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, malic acid, maleic acid, methylsulfamic acid, chloroacetic acid, 3-hydroxypropionic acid, polyaminopolycarboxylic acid, bisulfate salts and combinations of these.

The acids may be used in an amount to provide a pH of about 4 or less once injected into the formation. The initial pH at the surface may be higher than the pH of fluid after it is introduced into the formation. Lower pH may be achieved subsequent to introduction of the slurry into the formation due to higher temperatures.

In certain applications, diversion of the treatment fluid may be necessary. When reservoirs with different zones of permeability are treated with the acid, the acid may flow into the high permeability zones and not stimulate the low permeability zones. To treat the low permeability zones, it may be necessary to divert the treatment fluid from high to low permeability zones. Diversion may be facilitated by a number of techniques. These may include the use of ball sealers or other diversion materials. Particulate materials that are subsequently removable, such as by dissolution and the like, may also be used. Examples of such particulates include rock salt, benzoic acid, degradable polyester particulates (such as poly (lactic acid), poly(glycolic acid), and polysuccinimide and their derivatives), oil-soluble-resin, etc. These materials may be introduced into the formation through the wellbore prior to introduction of the acid treatment fluid or with the treatment fluid itself. When the diversion materials are used with the treatment fluid, the fluid is pumped at a rate to penetrate the matrix of the rock without producing fractures where the fluid would be lost.

Diversion may also be achieved through the use of viscosified fluids. Such viscosified fluids may be those aqueous fluids that are thickened or gelled through the use of polymers or viscoelastic surfactants (VES) typically used in fracturing, frac-packing and gravel packing and the like. Such fluids are well known in the art. The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No.6,703,352 (Dahayanake et al.), each of which are incorporated herein by reference.

Foamed or energized fluids may also be used for diversion or for the acidizing fluid itself. These may be the thickened or gelled fluids previously described or other aqueous fluid. The foaming agent may include air, nitrogen or carbon dioxide. See, for example, U.S. Pat. No. 3,937,283 (Blauer et al.), incorporated herein by reference. Foaming aids in the form of surfactants or surfactant blends may be incorporated in the foamed fluid.

In certain applications, the treatment fluid may also be incorporated into a self-diverting fluid. Viscoelastic surfactants have been used at a low concentration that does not generate significantly increased viscosity in such applications and have been disclosed, for instance, in U.S. Pat. No. 7,299,870, which is herein incorporated by reference. By the addition of the treatment fluid components, in similar quantities to those previously described, into such VES fluids a self-diverting acid treatment fluid or viscoelastic diverting acid (VDA) may be formed. Optional self-diverting fluids within the current invention may include simplified acidizing fluids described herein, where the main treatment fluid is not preceded by acid preflush fluids (which lack HF).

Chelating agents may also be added with the sandstone-dissolving treatment fluid to prevent undesired precipitation of various other materials with metal ions, such as iron, calcium, magnesium and aluminum, resulting from the reaction of the hydrofluoric acid. These undesirable precipitation products may include calcium fluoride, aluminum fluoride, sodium fluorosilicates, potassium fluorosilicates and others. The chelating agents may be used in an amount of from about 10% to about 40% by weight of the treatment fluid. Suitable chelating agents include those described in U.S. Patent Publication No. 2004/00254079, which is herein incorporated by reference in its entirety. Examples of suitable chelating agents include malic acid, tartaric acid, citric acid, certain aminopolycarboxylate and polyaminopolycarboxylate chelating agents (such as, by non-limiting example, NTA (nitrilotriacetic acid), HEIDA (hydroxyethlimnodiacetic acid), HEDTA (hydroxyethylethylenediaminet-etraacetic acid, EDTA (ethylenediaminetetraacetic acid), CyDTA (cyclohexylenediaminetetraacetic acid), DTPA (diethylenetriaminepentaacetic acid)) and certain aminopolymethylenephosphonic acid chelating agents and some of their salts, and mixtures of these.

Corrosion inhibitors may also be added to the sandstone-dissolving treatment fluids. Conventional corrosion inhibitors may be used as long as they are compatible with chemicals present in, or generated during use by, the slurry. Compounds containing ammonium quaternary moieties and sulfur compounds may be suitable (see for example U.S. Pat. No. 6,521,028) for this purpose.

Other additives commonly used in oilfield treatment fluids, such as corrosion inhibitors, hydrogen-sulfide scavengers, friction reducers, clay control additives, wetting agents (surfactants), fluid loss additives, emulsifiers, agents to prevent the formation of emulsions, foaming agents, scale inhibitors, fibers, breakers and consolidating materials, may also be used. It is to be understood that whenever any additives are included, laboratory tests may be performed to ensure that the additives do not affect the performance of the fluid.

In treating a sandstone formation, the aqueous treatment fluid containing the hydrogen fluoride source and amorphous silica precipitation inhibitor, along with any other additives, may be formed at the surface. All of the different components may be individually manufactured, stored, transported to a job site, and added in any order to the aqueous carrier fluid to make the acidizing treatment fluid, which is then introduced into the formation through the wellbore. The treatment fluid may be batch mixed or mixed on-the-fly. The treatment may optionally be carried out as a single stage treatment with no preflush.

Certain embodiments of the current invention may contain, in addition to hydrofluoric acids, additives which give calcium-tolerance to the fluid. This fluid property allows the injection of the treatment fluid into the formation through the wellbore as a single stage without introducing an acid-containing fluid preflush into the formation prior to introducing the treatment fluid. However, in certain embodiments, aqueous brine preflush and/or acid preflush stages (which lack hydrofluoric acid or sources of hydrofluoric acid) may precede the main treatment fluid injection.

The treatment fluid may be used at bottomhole static temperatures (BHST) of from about 35 to about 200° C.

In acidizing treatments carried out at pressures below the fracture pressure of the formation, it is most preferable to flow-back the treatment fluid from the formation immediately. However, the fluid may optionally also be shut-in after injection into the formation before flowing back to the surface. Shut-in periods may range from about 0.5 to about 24 hrs.

The goal of matrix acidizing of siliceous formations is to dissolve aluminosilicate particles that damage the formation permeability. In conventional treatments of aluminosilicates/clays exposed to acidizing fluids that contain hydrofluoric acid, there is typically an initial spike in the dissolved-silicon concentration after the treatment fluid is introduced due to rapid dissolution of the aluminosilicate materials of the formation. However, the dissolved-silicon concentration in the treatment fluid then decreases due to the precipitation of amorphous silica. Without the use of the amorphous silica precipitation inhibitors, the silicon concentration of dissolved silicon typically falls below 300 ppm within about 1 hour, as measured by analytical chemistry techniques, such as Inductively-Coupled-Plasma Optical Emission Spectroscopy (ICP-OES) or Atomic Absorption Spectroscopy (ICP-AAS) techniques. With the use of the amorphous silica precipitation inhibitors, however, the drop in the amount of dissolved silicon remains high and may even increase as more aluminosilicate materials are dissolved by the treatment solution and remain in solution. The dissolved silicon concentration thus typically remains above about 500 ppm, 1000 ppm, 2000 ppm or more after even 100 minutes or more. Flowback samples of the treatment fluid recovered from the wellbore should exhibit this phenomenon. This makes the acidizing treatments more effective as there is less precipitated silica that can clog the sandstone porespaces or damage the formation permeability.

The follow examples serve to further illustrate the invention.

EXAMPLES

Test Procedures

Different slurry tests were carried out to demonstrate amorphous silica precipitation inhibition. These tests utilized a slurry reactor available from Parr Instrument Company, Moline, Ill., which included a 4500 series Parr pressure reactor with a capacity of 1 L of fluid. In each test, the fluid in the reactor was stirred at 100 rpm using a 4 bladed impeller driven by a magnetic drive-coupled electric motor. The cell was fitted with a 4" (10.16 cm) dip tube to enable the acquisition of samples on a timed basis. The cell was also fitted with a backpressure regulator, which was set at 200 psi (1380 kPa). The reactor cell and internal parts were constructed of Hastelloy B. Approximately 70 grams of solid mineral was placed into a Teflon cup, which was fitted to the inside of the reactor cell. The cell was then sealed and heated to the desired reaction temperature. Separately, approximately 500 g of the acid solution under examination was pumped into an accumulator housing and was heated separately to the desired temperature. When both chambers were at the test temperature, the test fluid was transferred to the chamber containing the stirred clay (at 100 rpm) and the test time was started. The tests were carried out for 4 hours. Fluid samples were collected at targeted intervals throughout the experiment, were filtered through 0.2 micron filters, and were diluted with deionized water for ICP analysis. The concentrations of dissolved aluminum and silicon resulting from efficient clay dissolution were measured in each of those samples using a Perkin-Elmer Optima 2000 DV inductively coupled plasma (ICP) optical emission spectrometry (OES) instrument. The residual solids at the end of the experiment were rinsed, filtered, and were qualitatively analyzed using a Rigaku Miniflex X-ray Diffractometer (XRD).

Example 1

Three slurries were tested using the Test Procedures described above. A first "control" slurry was prepared without the use of any amorphous silica precipitation inhibitor. A series of three slurry test were carried out at 80° C. (176° F.) using 35 g of ground kaolinite and 35 grams of calcium carbonate with 500 mL of acidizing fluids. The first control acidizing treatment fluid used a solution of roughly 6 mol/L HCl and roughly 0.54 mol/L hydrofluoric acid (active concentration as prepared using ammonium bifluoride). A second control acidizing treatment fluid used roughly 6 mol/L HCl and roughly 0.54 mol/L hydrofluoric acid (active concentration as prepared using ammonium bifluoride). A third solution contained roughly 6 mol/L HCl and roughly 1.08 mol/L HF (as prepared using ammonium bifluoride) in addition to 10 wt % of Rohm & Haas ACUMER® 5000 (w/w %) (which is a 45% commercial blend of polymer) and was used in a comparable slurry experiment to that of the control experiments at 80° C. (176° F.) using 35 g of ground kaolinite clay and 35 g of calcium carbonate with 500 mL of acidizing fluid.

The results of the tests are presented in FIG. 1. The concentration of silicon in solution in the 6/0.5 mol/L (HCl:HF) control slurry (with no ACUMER® 5000 additive) reached a peak concentration of 1680 ppm, followed by a decrease to a steady-state concentration of 267 ppm at the end of the experiment. The second control slurry test (6/1 mol/L HCl: HF) led to a silicon concentration peak of 2340 ppm followed by a final steady-state concentration of 117 ppm. Compared to the results of the control slurries, the fluid containing ACUMER® 5000 additive demonstrated a peak concentration of [Si]=3500 ppm, followed by a decrease to a steady state concentration of [Si]=1020 ppm. While there was still evidence of some precipitation of silica (evident in the decrease in silicon concentration from the peak value), the steady state concentration for the slurry containing the ACUMER® 5000 additive at the end of the experiment was nearly fourfold than that of the control fluid. This correlates to a significant reduction in the amount of silica precipitate, which would likely have a pronounced impact on the stimulation results in a field scenario.

Example 2

Four different acidizing treatment fluids were prepared and used in slurries according to the Test Procedures described above. The tests were carried out at 60° C. (140° F.) using 70 g of ground kaolinite with 500 mL of the acidizing fluids. A control slurry was prepared using a solution of roughly 6 mol/L HCl and roughly 0.54 mol/L hydrofluoric acid (active concentration as prepared using ammonium bifluoride) without any amorphous silica precipitation inhibitor. Solutions of 6 mol/L HCl and roughly 0.54 mol/L hydrofluoric acid were also mixed with different concentrations of an organosilane compound at 1 wt %, 2 wt % and 3 wt %. The organosilane compound used was N-[3-(trimethoxysilyl)propyl]ethylene diamine (TSPED), available from Aldrich Chemical Company, Inc. as 97% active. The results are presented in FIG. 2.

Figure 2:
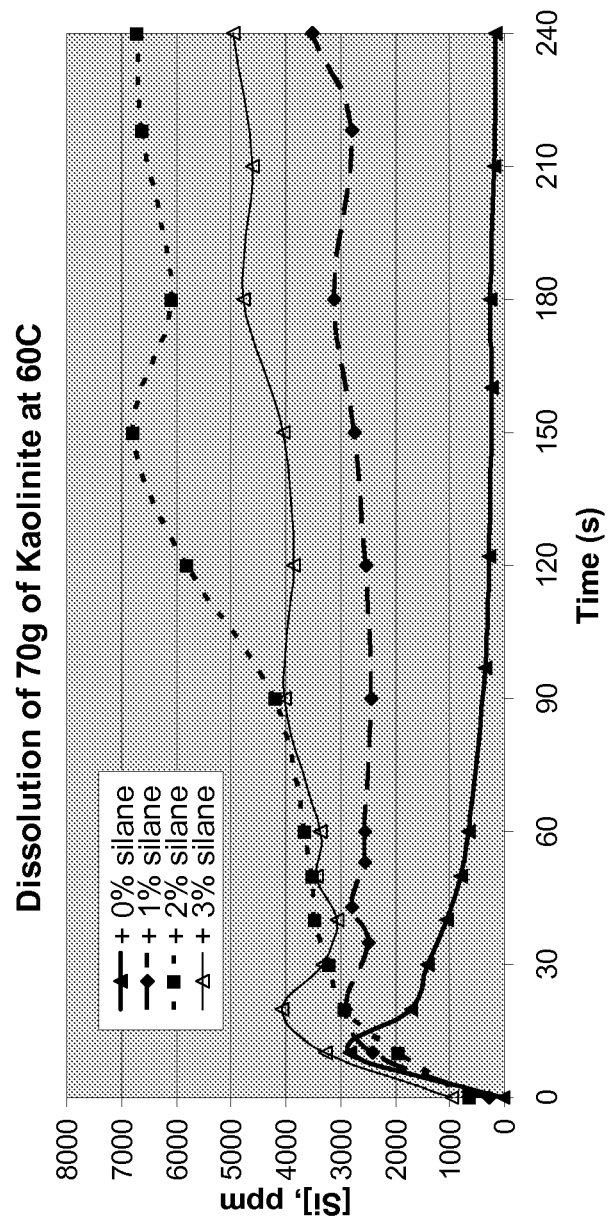
FIG. 2 is a plot of the concentration of silicon over time in acidizing fluids without and with the use of various amounts of organosilane silica-precipitation inhibitor used in dissolving kaolinite.

As can be seen from FIG. 2, the addition of 1 wt % of the organosilane minimized the precipitation of insoluble silica particles, as indicated by the absence of a decrease of the concentration of silicon in solution. An increase of the concentration of organosilane at 2% and 3% in the formulation actually lead to an increase in the concentration of silicon present in the solution where a drop in silicon concentration would typically be observed. The increase in dissolved silicon concentrations do not appear to increase linearly with increased organosilicon additive concentration (the curve related to 2% organosilane appears comparable to or higher than that from the 3% organosilane experiment). It should be noted that each aqueous-soluble organosilane additive concentration (1, 2, and 3 w/w %) will lead to an inherent concentration of dissolved silicon (1266, 2532, and 3798 ppm, respectively); however, those values have already been subtracted from the concentrations displayed in FIG. 2 and the values thus displayed are related directly to the dissolution of kaolinite and corresponding decrease in the amount of amorphous silica precipitate.

Example 3

Similar acidizing treatment fluids were prepared and used in slurries according to the Test Procedures described above in order to determine the overall reaction rate toward clays. The tests were carried out at 60° C. (140° F.) using 70 g of ground kaolinite with 500 mL of the acidizing fluids. A control slurry was prepared using a solution of roughly 6 mol/L HCl and roughly 0.54 mol/L hydrofluoric acid (active concentration as prepared using ammonium bifluoride) without any amorphous silica precipitation inhibitor. Solutions of 6 mol/L HCl and roughly 0.54 mol/L hydrofluoric acid were also mixed with different concentrations of an organosilane compound at 1 wt % and 3 wt %. The organosilane compound used was N-[3-(trimethoxysilyl)propyl]ethylene diamine (TSPED), available from Aldrich Chemical Company, Inc. as 97% active.

Figure 3:
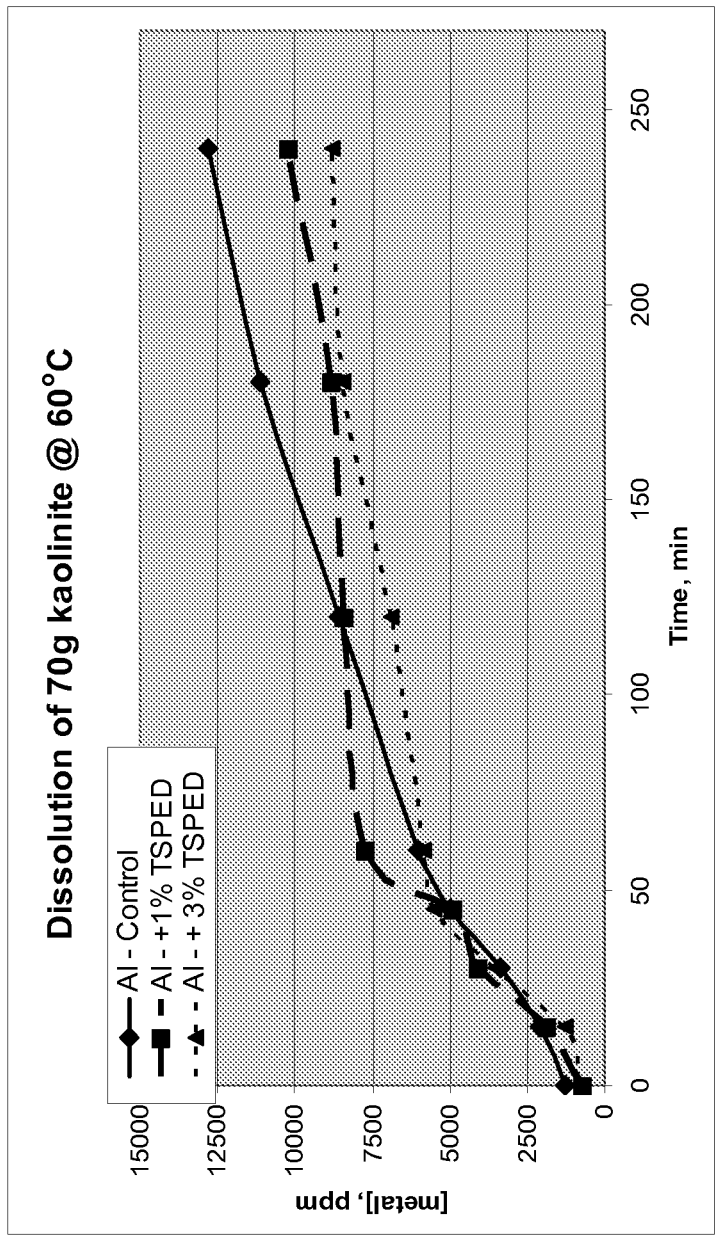
FIG. 3 is a plot of the concentration of aluminum over time in acidizing fluids without and with the use of various amounts of organosilane silica-precipitation inhibitor used in dissolving kaolinite.

The results are presented in FIG. 3. It is evident from the plots of the upward slope of aluminum concentration that there is little or no difference in reaction rate of the solution of HCl/HF in the absence versus the presence of organosilane additive. All three curves show an initial sharp increase in dissolved aluminum to reach a similar magnitude (roughly 6-7000 ppm), followed by what seems to be a change in rate to a lower slope (dissolution rate). Thus, the use of the organosilanes did not reduce the reaction rate of acidizing solutions toward clays; instead, the results of FIG. 3 indicate that the dissolution rate of these solutions of HCl/HF/organosilane toward clays are comparable to those seen in control fluids that lacked organosilane additive.

Example 4

Three different acidizing treatment fluids were prepared and used in slurries according to the Test Procedures described above. The tests were carried out at 60° C. (140° F.) using 70 g of ground kaolinite with 500 mL of the acidizing fluids. A control slurry was prepared using a solution of roughly 6 mol/L HCl and roughly 0.54 mol/L hydrofluoric acid (active concentration as prepared using ammonium bifluoride) without any amorphous silica precipitation inhibitor. Solutions of 6 mol/L HCl and roughly 0.54 mol/L hydrofluoric acid were also mixed with different concentrations of a phosphonate compound at 1 wt % and 2 wt %. The phosphonate compound used was 1-hydroxyethylene-1,1-diphosphonic acid, available from Shandong Taihe Water Treatment Co., Ltd. as 100% active. The results are presented in FIG. 4.

Figure 4:
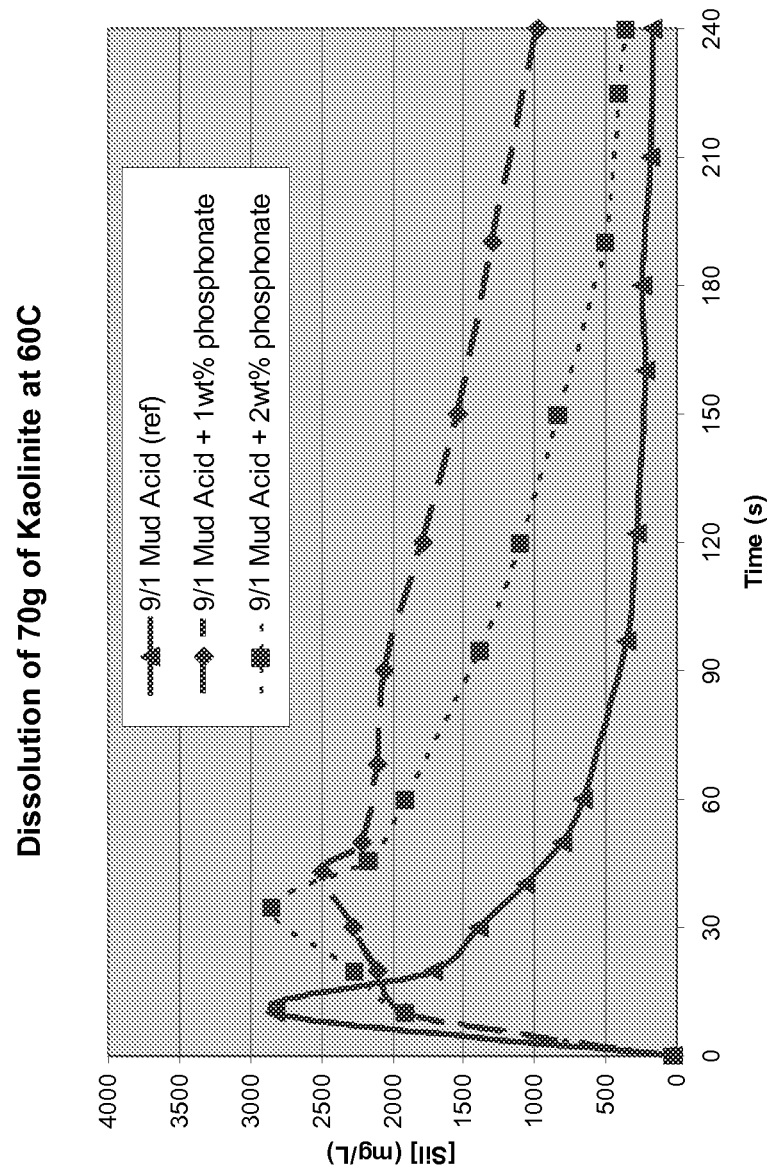
FIG. 4 is a plot of the concentration of silicon over time in acidizing fluids without and with the use of various amounts of phosphonate silica-precipitation inhibitor used in dissolving kaolinite.

As can be seen from FIG. 4, the addition of 1 wt % of the phosphonate minimized the precipitation of insoluble silica particles, as indicated by the increase of the final concentration of dissolved silicon in solution. An increase of the concentration of phosphonate at 2% in the formulation actually lead to a further increase in the concentration of silicon present in the solution.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a siliceous formation penetrated by a wellbore, the method comprising:

forming a treatment fluid comprising an aqueous fluid containing a hydrogen fluoride source and an amorphous silica precipitation inhibitor, wherein the amorphous silica precipitation inhibitor is selected from the group consisting of:

copolymers and homopolymers of acrylic acid and/or maleic acid or salts or derivatives thereof;

organosilanes, amines of an organosilane or esters of an organosilane,;

organosilicons having a structure represented by the formula $Si(OR)_3(R'NH_2)$, where R and R' are each organic groups that are the same or different, phosphonate compounds having a structure represented by the formula:

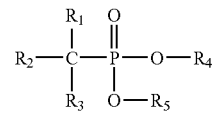

wherein $R_1$ $R_2$ and $R_3$ is each independently hydrogen, alkyl, aryl, phosphonate, phosphate, acyl, amine, hydroxyl or carboxyl group, and wherein $R_4$ and $R_5$ is each independently hydrogen, sodium, potassium, ammonium or an organic radical, and combinations of these; and introducing the treatment fluid into the siliceous formation through the wellbore at a pressure below the fracture pressure of the siliceous formation to facilitate dissolution of formation materials, the amorphous silica inhibitor being capable of inhibiting precipitation of amorphous silica so that the treatment fluid contains at least about 500 ppm of silicon in solution after at least about 100 minutes subsequent to the treatment fluid being introduced into the siliceous formation.

2. The method of claim 1, wherein the amorphous silica precipitation inhibitor is present in the treatment fluid in an amount of from about 0.1% to about 15% by weight of the treatment fluid.

3. The method of claim 1, wherein the amorphous silica precipitation inhibitor is at least one member selected from the group consisting of an organosilane and a phosphonate compound that is present in the treatment fluid in an amount of from about 0.1% to about 10% by weight of the treatment fluid.

4. The method of claim 1, wherein the hydrogen fluoride source is at least one member selected from the group consisting of hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers, and combinations of these.

5. The method of claim 1, wherein the treatment fluid further comprises at least one member selected from the group consisting of hydrochloric acid, nitric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, phosphonate acids and esters thereof, malic acid, maleic acid, methylsulfamic acid, methanesulfonic acid, chloroacetic acid, 3-hydroxypropionic acid, polyaminopolycarboxylic acid derivatives, polycarboxylate derivatives, and combinations of these acids and/or their salts.

6. The method of claim 1, wherein the treatment fluid is introduced into the siliceous formation through the wellbore as a single-stage.

7. A method of treating a siliceous formation penetrated by a wellbore, the method comprising:
forming a treatment fluid comprising an aqueous fluid containing a hydrogen fluoride source and a polycarboxylate, a salt of a polycarboxylate and/or polycarboxylic acid capable of inhibiting precipitation of amorphous silica,
wherein the polycarboxylate, the salt of a polycarboxylate and/or polycarboxylic acid is selected from the group consisting of copolymers and homopolymers of acrylic acid and/or maleic acid, salts thereof and derivatives thereof, and
wherein the polycarboxylate, the salt of a polycarboxylate and/or polycarboxylic acid is capable of inhibiting precipitation of amorphous silica; and
introducing the treatment fluid into the siliceous formation through the wellbore of the siliceous formation to facilitate dissolution of formation materials.

8. The method of claim 7, wherein the polycarboxylate, the salt of a polycarboxylate and/or polycarboxylic acid is present in the treatment fluid in an amount of from about 1% to about 15% by weight of the treatment fluid.

9. The method of claim 7, wherein the hydrogen fluoride source is at least one member selected from the group consisting of hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers, and combinations of these.

10. The method of claim 7, wherein the treatment fluid further comprises at least one member selected from the group consisting of hydrochloric acid, nitric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, phosphonate acids and esters thereof, malic acid, maleic acid, methylsulfamic acid, methanesulfonic acid, chloroacetic acid, 3-hydroxypropionic acid, polyaminopolycarboxylic acid derivatives, polycarboxylate derivatives, and combinations of these acids and/or their salts.

11. The method of claim 7, wherein the treatment fluid is introduced into the siliceous formation through the wellbore as a single-stage.

12. The method of claim 7, wherein the treatment fluid is introduced into the siliceous formation at a pressure below the fracture pressure of the formation.

* * * * *